United States Patent
Wetrich

[11] 3,939,733
[45] Feb. 24, 1976

[54] MECHANICAL TRANSMISSION AND CONTROLS THEREFOR

[75] Inventor: Peter Donald Wetrich, Cedar Falls, Iowa

[73] Assignee: Deere & Company, Moline, Ill.

[22] Filed: July 30, 1974

[21] Appl. No.: 492,951

[52] U.S. Cl. .................... 74/740; 74/477; 74/337.5
[51] Int. Cl.² .......................................... F16H 37/00
[58] Field of Search .......... 74/740, 477, 335, 337.5

[56] References Cited
UNITED STATES PATENTS

| | | | |
|---|---|---|---|
| 2,710,546 | 6/1955 | DuShane et al. | 74/360 |
| 2,772,652 | 12/1956 | DuShane | 74/337.5 |
| 2,839,941 | 6/1958 | Rugen | 74/337.5 |
| 3,774,474 | 11/1973 | Recker et al. | 74/740 |
| 3,774,475 | 11/1973 | Meysenburg | 74/740 |

*Primary Examiner*—Samuel Scott
*Assistant Examiner*—Randall Heald

[57] ABSTRACT

A mechanical transmission which includes a first speed change section optionally providing a direct drive or an underdrive, a second speed change section driven by the first section and optionally providing a plurality of forward and reverse speed ratios, separate control levers for the first and second sections movable on a common axis, one lever being movable between two positions to condition the first section for direct drive when in one position and for underdrive when in the other position, the second lever being movable to a plurality of positions to condition the second section for one of its speed ratios in each position, and interlock means acting between the two levers to prevent movement of the levers for conditioning the second section for its higher ratios when the first section is conditioned for underdrive and to prevent conditioning of the first section for underdrive when the second section is conditioned for any one of its higher ratios.

7 Claims, 9 Drawing Figures

MECHANICAL TRANSMISSION AND CONTROLS THEREFOR

BACKGROUND OF THE INVENTION

The present invention relates to a change speed transmission and controls therefor, and more particularly relates to improvements in transmissions and controls of the type disclosed in U.S. Pat. No. 2,710,546 which issued to DuShane and Rugen on June 14, 1955, U.S. Pat. No. 2,772,652 which issued to DuShane and Rugen on Dec. 4, 1956, and U.S. Pat. No. 2,839,941, which issued to Rugen on June 24, 1958. The transmission disclosed in the above-mentioned patents is particularly suited for use in tractors inasmuch as it provides a large number of forward and reverse speeds as is required for tractors. Specifically, the transmission disclosed in the above-mentioned patents will provide eight forward speeds and four reverse speeds although as a practical matter not all of the possible reverse speeds are utilized. The transmission controls disclosed in the above-mentioned patents provide a convenient way of conditioning the transmission for its different speeds or transfer ratios.

While the speeds or transfer ratios of the transmission disclosed in the above-mentioned patents are adequate for the most common operations, some operations require additional transfer ratios so that slower speeds or more power transfer can be obtained. One simple and economical way to increase the speeds or transfer ratios obtainable from the transmission disclosed in the above-mentioned patents is to add an additional transmission section to the input thereof which would provide both a direct drive and an underdrive so that the number of speed ratios actually obtainable would be doubled. However, this would cause other problems inasmuch as the additional transmission section, when in the underdrive condition, could increase the torque to the basic transmission so that when the basic transmission is in the higher speeds damage would be very likely to result from overloading.

SUMMARY OF THE INVENTION

The object of the present invention is to increase the number of speeds or transfer ratios obtainable from transmissions of the type disclosed in U.S. Pats. Nos. 2,710,546, 2,772,652 and 2,839,941 by providing a two speed or two transfer ratio transmission section in the input thereof and to provide an interlock between the controls of the two transmission sections which prevents the use of selected ones of the transfer ratios of the main section when the two transfer ratio section is in a selected one of its ratios, and to prevent use of the selected ratio of the two ratio transmission section when the main transmission section is in any one of its selected ratios.

The above object and additional objects and advantages of the present invention will become apparent to those skilled in the art from a reading of the following detailed description when taken in conjunction with the accompanying drawings.

DESCRIPTION OF THE PREFERRED EMBODIMENT

Figure 1:
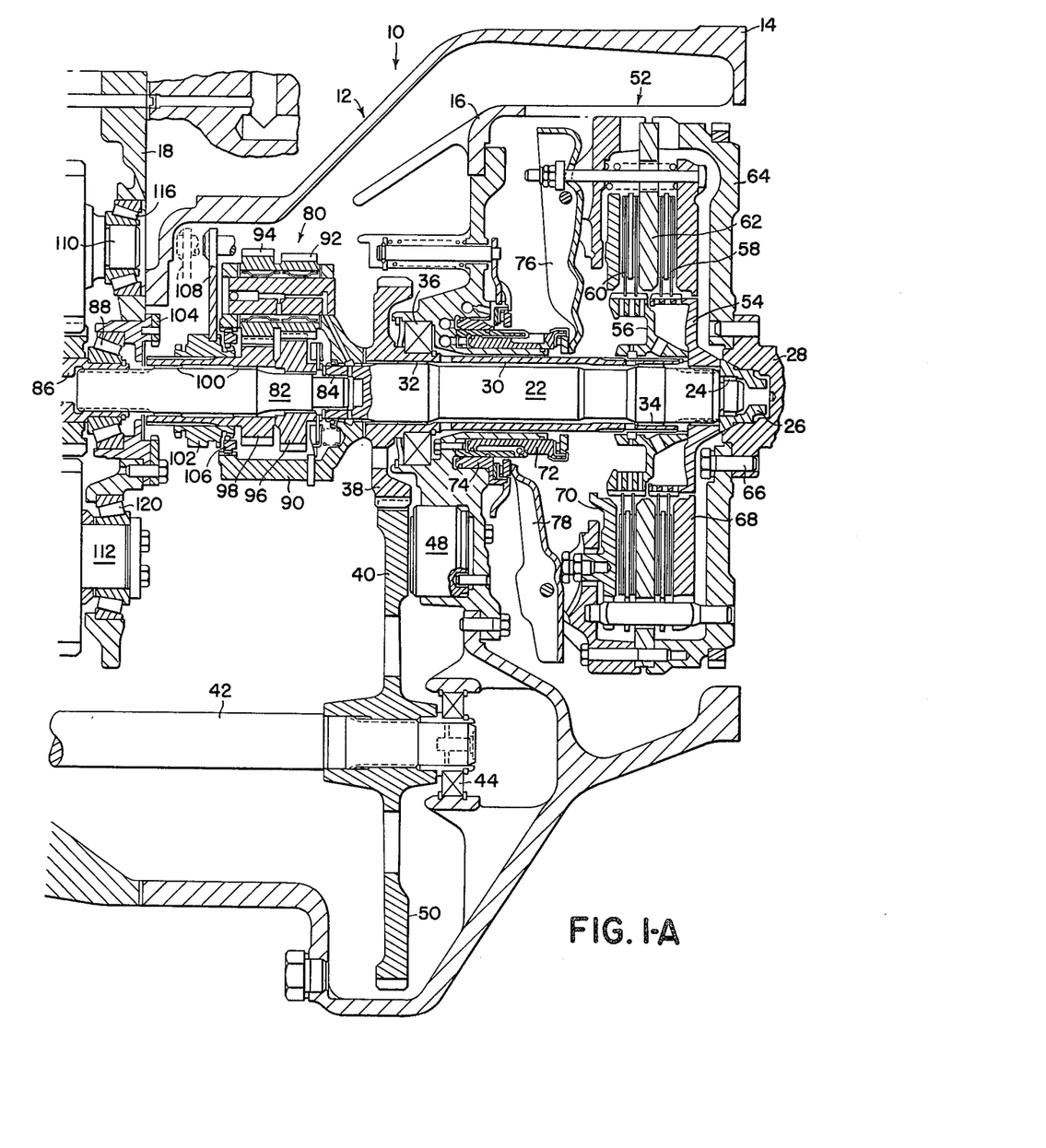
FIG. 1 is a longitudinal sectional view of a transmission constructed in accordance with the present inventions, FIG. 1A illustrating the input and forward portion of the transmission and FIG. 1B illustrating the rear portion and output of the transmission.

Referring now to FIG. 1, there is shown therein a transmission indicated in its entirety by the numeral 10 and which includes a housing 12, the forward portion 14 of which is adapted to be connected to an engine block. The housing 12 includes a forward support wall 16, an intermediate support wall 18, and a rear or left end support wall 20. The support wall 16 and the engine to which the transmission is to be attached define a clutch housing, and a traction input shaft 22 extends axially within the clutch housing. The right end of the input shaft 22 is supported by bearing 24 located within a bushing 26 which is affixed within an opening extending axially into the end of an engine crankshaft shown partially at 28. The traction input shaft 22 extends through a hollow power-take-off (herein abbreviated as PTO) input driveshaft 30 and is journaled therein at its left end and intermediate its ends by bearings 32 and 34. The PTO input driveshaft extends through an opening provided in the support wall 16 and has its left end supported therein by bearing 36. The right end of the PTO input driveshaft is supported by the traction input shaft 22 through the bearing 34. The left end of the PTO input driveshaft 30 includes an integral gear 38 which is in constant mesh with a gear 40 fixed to a PTO shaft 42 having its right end supported by bearing 44 carried by the support wall 16 and an intermediate portion journaled in a bearing 46 carried by the support wall 20. A hydraulic brake piston 48 is axially shiftably mounted in the support wall 16 for selective braking engagement with an annular surface 50 formed on the gear 40.

Located in the clutch housing is a dual clutch assembly indicated generally at 52 and including a traction clutch member 54 having a hub fixed for rotation with the traction input shaft 22 and a PTO clutch member 56 having a hub located axially adjacent the hub of the traction clutch member and fixed for rotation with the PTO input driveshaft 30. The hubs of the traction and PTO clutch members 54 and 56 carry annular, axially shiftable friction elements 58 and 60, respectively. A backing plate 62 of annular shape is located between the traction clutch and PTO clutch friction elements and is fixed to the rim of a flywheel 64 which is fixed to the engine crankshaft 28 by bolts 66. Pressure plates 68 and 70 are located on opposite sides of the traction and PTO clutch friction elements and, as is convenventional, are mounted for rotation with the flywheel 64 as well as for axial movement toward and away from the friction elements 58 and 60 to frictionally engage the latter with the backing plate 62.

Actuating means for the traction and PTO clutches include annular, ring-like hydraulic pistons 72 and 74, respectively, which are mounted in the support wall 16 in concentric relationship to each other and to the driveshafts 22 and 30 and which engage the inner ends of sets of radially extending clutch operating fingers 76 and 78. When fluid pressure is applied to the left end of the piston 72 it shifts to the right against the inner ends of the clutch operating fingers 76 (only one of which is shown) to engage the traction clutch and establish a driving relationship between the engine crankshaft 28 and the traction input shaft 22. When fluid pressure is applied to the left end of the piston 74 it shifts to the right against the inner ends of the clutch operating fingers 78 (only one of which is shown) to engage the PTO clutch and establish a driving relationship between the engine crankshaft 28 and the PTO input shaft 30.

The support walls 16 and 18 define therebetween a first speed change transmission section which houses, directly behind the PTO drive gear 38, a two-speed or two transfer ratio planetary transmission indicated generally at 80. The left end of the traction input shaft 22 extends beyond the PTO drive gear 38 and forms the input for the first transmission section. A first transmission section output shaft 82 has its right end supported by bearings 84 carried in a bore provided in the left end of the input shaft 22. The left end of the ouput shaft 82 is keyed to and supported by the right end of a second transmission section input shaft 86 which in turn is journaled in bearing 88 carried by the support wall 18. A planetary carrier 90 is keyed to the projecting left end of the input shaft 22 and rotatable mounts planet cluster gears which include integral planet gears 92 and 94 in meshing engagement with sun gears 96 and 98 respectively. The sun gear 96 is mounted on and keyed to the ouput shaft 82 and the sun gear 98 is rotatably mounted on the output shaft 82 through bearings 100. A clutch element 102 is keyed to a flange or hub integral with the sun gear 98 for axial sliding movement with respect thereto and rotation therewith. The clutch element 102 has external teeth at its opposite ends for selectively engaging the teeth of a ring gear 104 fixed to the support 18 or the teeth of a ring gear 106 carried by and fixed to the left end of a carrier 90. A control arm 108 rotatably engages the clutch element 102 and axially fixed with respect thereto for moving the clutch element 102 between its opposite positions for engagement with the gears 104 and 106.

When the clutch element 102 is in the forward position as illustrated, the sun gear 98 is locked to the planet carrier 90 so that rotation of the input shaft 22 is transferred to the output shaft 82 through the carrier 90, the sun gear 98, the planetary cluster gears 94 and 92, and the sun gear 96 in a direct drive ratio. When the clutch element 102 is shifted to the left as represented by the dotted line position of the control arm 108 so that the clutch element engages the ring gear 104, the sun gear 98 is fixed with respect to the housing 12 so that the rotation of the input shaft 22 is transferred to the output shaft 82 in an underdrive ratio. In this mode, rotation of the carrier 90 by the input shaft 22 causes rotation of the planetary cluster with respect to the carrier due to the engagement between the sun 98 and planetary gear 94. Rotation of the planetary cluster in turn causes rotation of the sun gear 96 which is transferred to the output shaft 82.

The support walls 18 and 20 define therebetween a second transmission section which houses an eight speed transmission which includes the rear section input shaft 86, a countershaft 110, and a rear section output shaft 112. The right end of the input shaft 82 is supported on the wall 18 by the bearing 88 as was previously mentioned, and its left end is supported in the wall 20 by a bearing 114. The right and left ends of the countershaft 110 are supported on the walls 18 and 20 by bearings 116 and 118 respectively. The right and left ends of the output shaft 112 are supported by walls 18 and 20 through bearings 120 and 122 respectively. It should be noted that the countershaft 110 is shown displaced upwardly from its true position in order that the structure may be more clearly understood. The input shaft has journaled thereon, from right to left, a high range pinion 124, a low range pinion 126 and a reverse pinion 128. The output shaft has journaled thereon, from left to right, a large output gear 130 in mesh with the pinion gear 128, a small output gear 132, a first intermediate output gear 134 and a second intermediate output gear 136. The countershaft includes a small countershaft gear 138 which is in mesh with the large output gear 130, a large countershaft gear 140 which is in mesh with the low range pinion 126 and the output gear 132, a first intermediate countershaft gear 142 which is in mesh with the first intermediate output gear 134, and a second intermediate countershaft gear 144 which is in mesh with the high range pinion 124 and the second intermediate output gear 136.

For the purpose of selectively establishing either high or low range driving connections between the input shaft 86 and the countershaft 110, a dual speed or range selector clutch 146 is located between the input pinions 124 and 126. Clutch 146 includes a pair of synchronizer rings 148 and 150 located on opposite sides of a synchronizer member 152 which is splined to a hub 154 as at 156, the hub 154 in turn being keyed to the input shaft 86. The synchronizer ring 148 is splined as at 158 to the high range input pinion 124 and the synchronizer ring 150 is splined as at 160 to the low range input pinion 126. When the synchronizer rings are shifted to the left, synchronization occurs between the ring 148 and the synchronizer member 152, after which the splined connection at 158 is carried over the splines 156 on the hub 154. Thus, the hub 154, synchronizer ring 148 and the high range input pinion 124 are connected for rotation in unison. This positively connects the high range pinion 124 to the input shaft 86 so that rotation of the input shaft 86 is transferred through the pinion 124 to the countershaft gear 144 and countershaft 110 to cause forward rotation of the countershaft 110 in a high range. When the synchronizer rings are shifted to the right, synchronization occurs between the ring 150 and synchronizer member 152, after which the splined connection at 160 is carried over the splines 156 of the hub 154. Thus the hub 154, synchronizer ring 150 and low range input pinion 126 are connected for rotation in unison. This positively connects the low range pinion 126 to the input shaft 86 so that rotation of the input shaft 86 is transferred to the countershaft 110 in a low range through the pinion 126 and countershaft gear 140.

The reverse pinion 128 can be connected to the input shaft 86 through a reverse clutch 162 located on the input shaft 86 between the reverse pinion and low range pinion. The clutch 162 includes an externally splined ring 164 keyed to the shaft 86 and an internally splined ring 166 which is axially shiftable on the ring 164 to drivingly engage teeth 168 on the reverse pinion 128. With this engagement, rotation of the input shaft 86 is transferred through the reverse pinion 128 to the large output gear 130 and to the countershaft 110 through the reverse pinion 128, the large output gear 130 and the countershaft gear 138.

For transferring rotation of the countershaft 110 to the output shaft 112, the output shaft carries first and second output shaft clutches 170 and 172 each of which includes externally splined internal rings (not shown) keyed to the output shaft intermediate the output gears 130 and 132 and intermediate the output gears 134 and 136 respectively. Each of the clutches 170 and 172 also include internally splined external rings 174 and 176 which are axially shiftably mounted on the splines of the internal rings. When the external ring 174 is shifted to the left its internal splines drivingly engage teeth 178 on the output gear 130 to establish a low speed transfer ratio from the countershaft 110 to the output shaft 112 through the small countershaft gear 138 and the large output gear 130 or, if the reverse pinion 128 is coupled to the input shaft 86, to establish a low speed reverse transfer ratio between the input shaft 86 and the output shaft 112 through the reverse pinion 128 and the large output gear 130. If the ring 174 is shifted to the right its internal splines drivingly engage teeth 180 on the small output gear 132 and establish a high speed transfer ratio from the countershaft 110 to the output shaft 112 through the large countershaft gear 140 and the small output gear 132. If the ring 176 is shifted to the left its internal splines drivingly engage teeth 182 on the output gear 134 and establish an intermediate speed transfer ratio from the countershaft 110 to the output shaft 112 through the first intermediate countershaft gear 142 and the first intermediate output gear 134. If the ring 176 is shifted to the right its internal splines drivingly engage teeth 184 on the second intermediate output gear 136 and establish a second intermediate transfer ratio from the countershaft 110 to the output shaft 112 through the second intermediate countershaft gear 144 and the second intermediate output gear 136.

The second section of the above-described transmission is of the type illustrated and described in the above-mentioned U.S. Pats. Nos. 2,710,546, 2,772,652 and 2,839,941. As is fully described in the above-mentioned patents, the second section of the transmission, through selective engagement of the clutches 146, 162, 170 and 172 will provide eight forward speeds and four reverse speeds. However, when used in conjunction with the first planetary transmission section which provides both direct and under drive transfer ratios, the overall transmission will provide 16 forward and eight reverse transfer ratios between the engine crankshaft 28 and output shaft 112.

Referring now to FIGS. 2 through 8, the manual controls for the transmission 10 will next be described. The control for the first planetary section of the transmission includes a manually operable lever 186 pivotally mounted on a pin 188 carried by any suitable fixed support 190. The lever 186 is somewhat in the form of a crank arm and has a link 192 pivotally connected to its short leg. The link 192 is connected in any suitable manner to the control arm 108 of the planetary transmission section so that movement of the lever 186 from the direct drive position illustrated in FIG. 2 to the underdrive position illustrated in FIG. 8 will cause movement of the control arm 108 to the dotted line position in FIG. 1A and the clutch element 102 to the left so that it engages the teeth on the ring gear 104 to lock the sun gear 98 to the transmission housing, and movement of the lever 186 back to the direct drive position illustrated in FIG. 2 will move the control lever 108 and the clutch element 102 back to their illustrated positions.

Figures 2, 3:
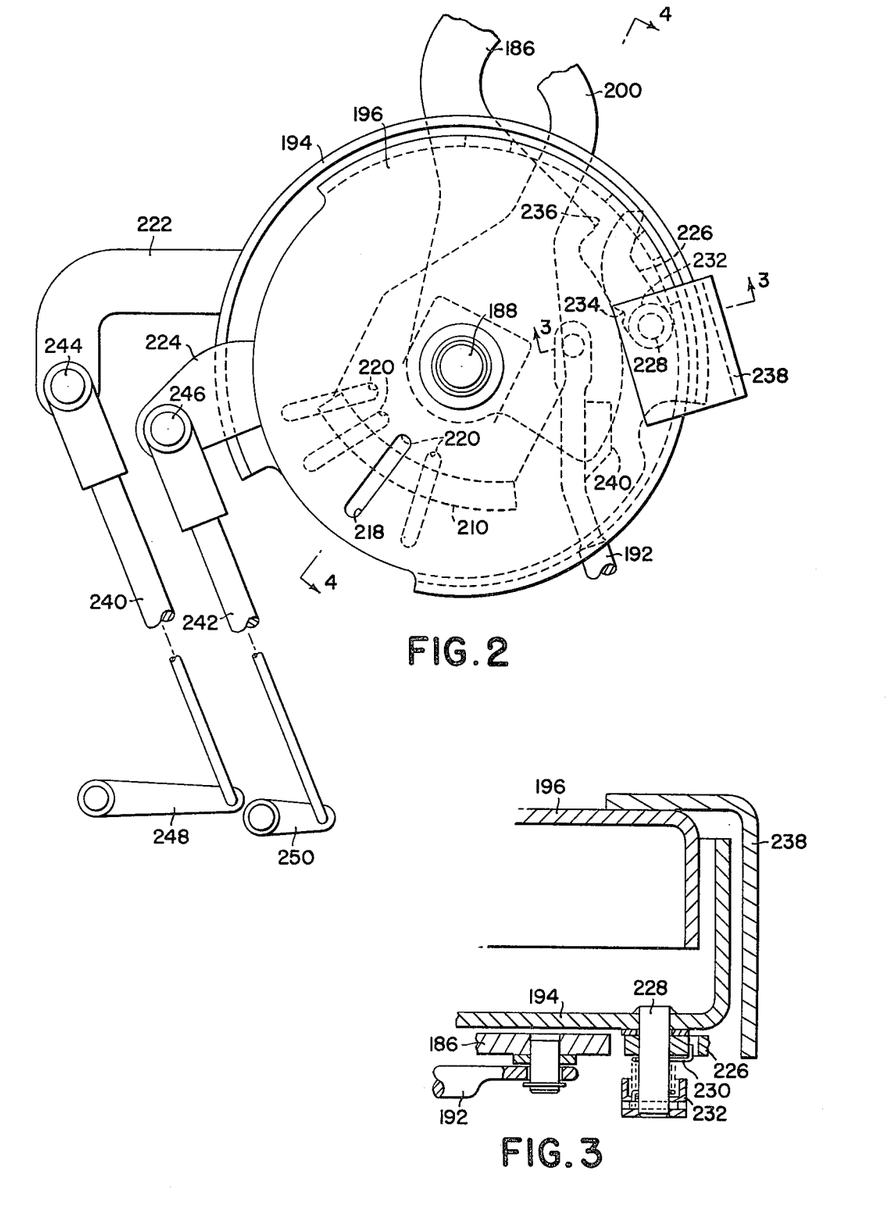
FIG. 2 is a side elevational view of controls for the transmission illustrated in FIG. 1.
FIG. 3 is a sectional view taken substantially along the lines 3—3 of FIG. 2.
Figure 4:
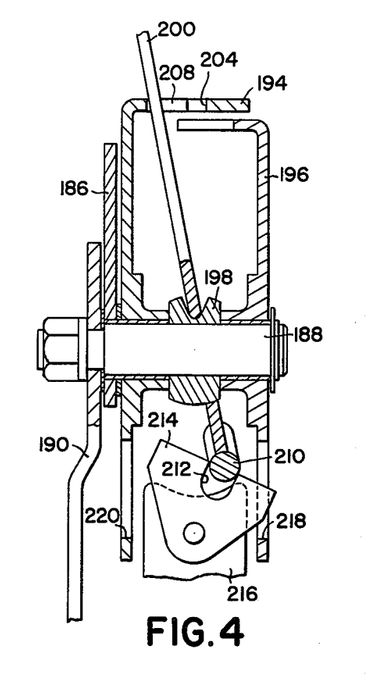
FIG. 4 is a sectional view taken substantially along the lines 4—4 of FIG. 2.

The control for the rear transmission section includes a pair of speed selector members or drums 194 and 196 which are rotatably mounted on the pin 188. For the purpose of convenience, the drum 196 will hereinafter be referred to as the speed range drum since rotation of this drum will selectively control the clutches 146 and 162 to optionally provide a high speed range, a low speed range or a reverse speed range transfer from the input shaft 86 to the countershaft 110. The drum 194 will be referred to as the speed change drum since rotation of this drum is used to selectively control the clutches 170 and 172 to selectively establish and change the transfer ratio between the countershaft 110 and output shaft 112. A bearing member 198 is mounted on the pin 188 between the drums 194 and 196, and a manually operable lever 200 is supported on the bearing member 198 for fore and aft movement about the axis of the pin 188 and for side to side pivotal movement about an axis transverse to the axis of the pin 188.

The drum 196 is provided with a series of four notches 202a, b, c and d which open toward the drum 194 and are of a size to receive the control lever 200. The drum 194 is provided with two elongated slots 204 and 206 which overlap and communicate with each other and which are positioned over the notches 202. The drum 194 is also provided with a notch 208 which is open to the slot 204 and is of a size to receive the manual control lever 200. In order to prevent simultaneous movement of the two drums 194 and 196, the lower end of the lever 200 is provided with an arcuate guide rod 210 which is slidable in an upwardly open notch 212 provided in a lock member 214 pivotally mounted on a support 216 for side-to-side movement about an axis perpendicular to the axis of the pin 188. The lower portion of the side face of the drum 196 is provided with a slot 218 for receiving the lock member 214 when the manual control lever 200 is tilted to the side into the notch 208. The lower portion of the side face of the drum 194 is provided with a series of four notches 220 for receiving the lock member 214 when the manual control lever 200 is pivoted to the opposite side to one of the notches 202. When the lever 200 is in a centered position the lock member 214 will extend into a slot in both the drums 194 and 196. In this manner, the drums 194 and 196 cannot be moved simultaneously since at all times at least one of the drums will be locked with respect to the support 216 by the lock member 214.

Figure 5:
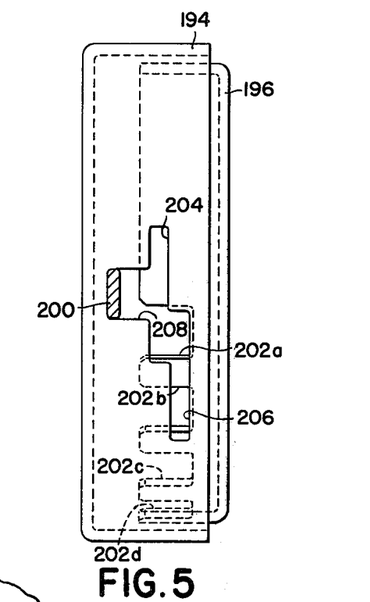
FIG. 5 is a top plan view of a portion of the controls illustrated in FIG. 2.

A pair of lever arms 222 and 224 are affixed to the drums 194 and 196, respectively, and extend rearwardly therefrom. Links 240 and 242 have their upper ends pivotally connected to the lever arms 222 and 224, respectively, at 244 and 246. The lower ends of the links 240 and 242 are pivotally connected to arms 248 and 250 which in turn are affixed to undisclosed control cams for the clutches 146, 162, 170 and 172. The control cams and their relationship with the various clutches are fully illustrated and described in the above-mentioned U.S. Pats. Nos. 2,772,652 and 2,839,941 and for a full understanding of the same reference should be had to these patents, the disclosures of which are hereby expressly incorporated into this description. As is fully explained in the above-mentioned U.S. patents, when the manual control lever 200 is in the position illustrated in FIG. 5, both of the clutches 170 and 172 are shifted to engage two of the output gears with the output shaft so as to effectively lock the rear transmission section. Thus, FIG. 5 illustrates a park position for the control lever 200. Movement of the control lever 200 so that it registers with the notch 202a rotates the speed change drum 194 so that, through the control arm 222, link 240, arm 248, and the undisclosed cam, the clutch 170 is shifted to couple the output gear 130 with the output shaft 112. The manual control lever 200 can then be shifted into the notch 202a. This latter movement unlocks the speed range drum 196 and locks the speed change drum 194 with the lock element 214. Movement of the lever 200 to the upper part of the slot 204 rotates the drum 196 so that the clutch 146, through the control arm 224, link 242, arm 250 and undisclosed cam, is shifted to the right to couple the low range input pinion 126 with the input shaft 86. With the low range pinion 126 coupled to the shaft 86 and the first or large output gear 130 coupled to the output shaft 112 the second section of the transmission is in its lowest speed transfer ratio. Movement of the lever 200 downwardly to the bottom of the slot 204 causes rotation of the drum 196 and movement of its associated linkage to shift the clutch 146 to the left so that the low range pinion 126 is released and the high range pinion 124 is coupled to the output shaft 86. In this condition the second section of the transmission is in its third speed transfer ratio or third gear. If the lever 200 is then shifted over into the slot 206 and moved downwardly it rotates the drum 196 through a neutral position in which the clutch 146 is disengaged to a position in which the clutch 162 is slid to the left to couple the reverse pinion 128 to the input shaft 86 to provide a low or first reverse speed ratio transfer through the rear section of the transmission.

To obtain additional speed transfer ratios through the rear transmission section the control lever 200 is returned to the notch 208. This movement disengages both the clutches 170 and 172, locks the drum 196 and releases the drum 194. The lever 200 can then be moved into registry with the notch 202b, which movement shifts the clutch 172 to the left to couple the output gear 134 with the output shaft 112. Then, by movement of lever 200 to the slots 204 and 206 to selectively couple the low range pinion 126, high range pinion 124 or reverse pinion 128 with the input shaft 88, second and fifth speed transfer ratios through the rear transmission section are obtained and a second reverse speed transfer ratio is obtained. When the lever 200 is engaged in the notch 202c the output gear 136 is coupled to the output shaft 112 and fourth and seventh forward speed transfer ratios and a third reverse speed transfer ratio can be obtained. When the lever 200 is engaged in the notch 202d the clutch 170 couples the output gear 132 to the output shaft 112 and sixth and eighth speed transfer ratios and a fourth reverse speed transfer ratio can be obtained. However, because the fourth reverse speed transfer ratio is higher than practical, it is, as explained in the above -mentioned patents, normally blocked out. The blocking out of the fourth reverse speed ratio on the rear transmission section can be done in any conventional manner and forms no part of the present invention.

From the foregoing it can be seen that the rear transmission section can be controlled, through the manual control lever 200, to provide a park condition in which it is locked, to provide eight distinct forward transfer speed ratios, and to provide three distinct reverse transfer ratios. When the first planetary section of the transmission is in its direct drive condition the rear section of the transmission provides normal forward speeds one through eight and normal reverse speeds one through three. If the first planetary section of transmission is shifted, through manipulation of the control lever 186, to its underdrive condition, it will provide extremely slow or creeper speeds so that through manipulation of the control lever 200 the rear section of the transmission will provide eight forward creeper speeds and three reverse creeper speeds. However, as mentioned in the Background of the Invention, the torque multiplication obtainable through the first planetary section of the transmission when in the underdrive or creeper drive could damage the rear section of the transmission when it is in its higher gears. Therefore, it has been found to be desirable to block out the three highest speed transfer ratios of the second transmission section when the first transmission section is in its underdrive condition. For similar reasons it has also been found to be desirable to prevent conditioning of the second transmission section for park when the first transmission section is in its underdrive or creeper drive condition. For this purpose an interlock system between the controls for the two transmission sections is provided.

The interlock system for the controls includes a pawl 226 pivotally mounted on a stub shaft 228 carried by the speed change drum 194. A torsion spring 230 encircles the stub shaft 228, is affixed to the stub shaft 228 and the pawl 226 and normally biases the pawl 226 in a counterclockwise direction as viewed in FIG. 2. The spring 230 is protected by a cap 232 which fits thereover, the cap 232 also functioning as a stop member as will be more fully hereinafter explained. The pawl 226 includes a curved cam follower surface which terminates in a notch 234 which cooperates with a shoulder or cam 236 on the control arm 186 in a manner best illustrated in FIG. 6 to prevent movement of the lever 186 under certain conditions as will be more fully hereinafter explained. The pawl 226 also engages a stop bracket 238 carried by the speed range drum 196 to prevent movement of the lever 186 under certain conditions as will be more fully hereinafter explained. To complete the interlock system, a stop block 240 is carried by the link 192 and engages with the cap 232 under certain conditions as will be more fully hereinafter explained.

Figure 6:
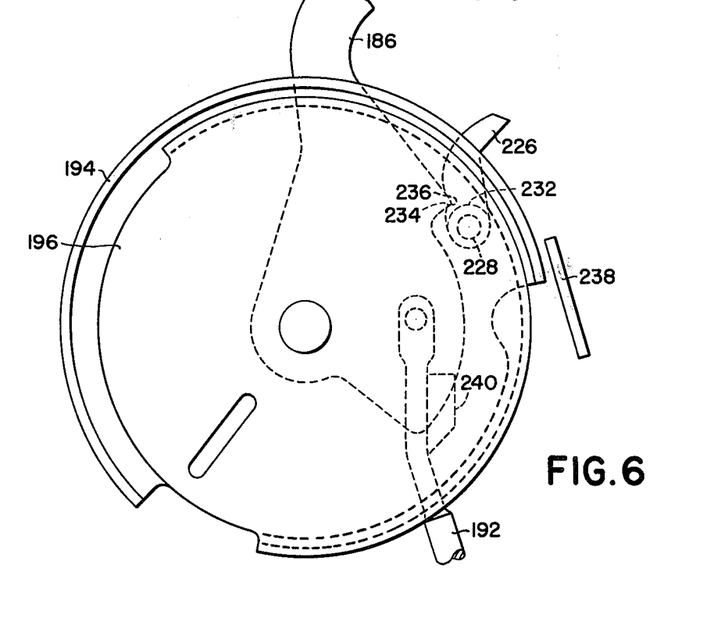
FIGS. 6, 7 and 8 are views similar to FIG. 2 illustrating different conditions of the controls.

The notch 234 in the pawl 226 and the shoulder 236 of the lever 198 cooperate to prevent the shifting the first transmission section to creeper drive when the second transmission section is in its sixth or eighth speed ratios. This is best illustrated in FIG. 6 wherein the speed change drum and the pawl 226 are shown in a position they would assume when the speed change drum has been rotated to couple the output gear 132 with the output shaft 112. The first transmission section control lever 186 is illustrated as slightly moved from its full direct drive position toward its underdrive or creeper drive position. After the lever 186 is moved a slight distance, its shoulder 236 engages in the notch 234 to prevent further movement. A similar cooperation occurs between notch 234 and shoulder 236 if the lever 186 is first moved to its creeper drive position and the speed change drum is then rotated toward a position in which the output gear 132 would be coupled with the output shaft 112. In this manner it is impossible to obtain the sixth and eighth speed transfer ratios from the second transmission section when the first transmission section is in its creeper drive condition, and it is impossible to move the control lever 186 to condition the first transmission section for creeper drive when the second transmission section is in either its sixth or eighth speed transfer ratios.

The interlock to prevent operation of the transmission with the first section in creeper drive and the second section in its seven speed transfer ratio can best be understood from FIG. 2 which shows the condition of the control levers and interlock parts when the first section of the transmission is in direct drive and the output gear 136 is coupled to the output shaft 112. If the control lever 200 is then shifted to rotate the range drum to couple the high range pinion 124 with input shaft 86 the stop bracket 236 carried by the range drum 196 will be rotated counterclockwise so that its upper edge is located just under and outwardly from the upper point of the pawl 226. If it is then attempted to shift the lever 186 to its creeper drive position the shoulder or cam 236 engages the pawl 226 and cams it outwardly against the force of spring 230 until it engages the stop bracket 238. This engagement prevents additional movement of the lever 186 so it is impossible for the lever 186 to reach its creeper drive position. If the low range pinion 126 is coupled to the input shaft 126 the lever 186 can be moved all the way to its creeper drive position, in which case engagement between the shoulder 236 of the lever 186 and the pawl 226 cams the pawl outwardly so that it extends above the stop bracket 238. If it is then attempted to move the control lever 200 to couple the high range input pinion 124 with the input shaft 86 the corresponding movement of the speed range drum 196 will be prevented by engagement of the stop bracket 238 with the pawl 226.

In this manner it is impossible to have the second section of the transmission conditioned for its seventh speed transfer ratio when the first section of the transmission is conditioned for underdrive.

Figure 7:
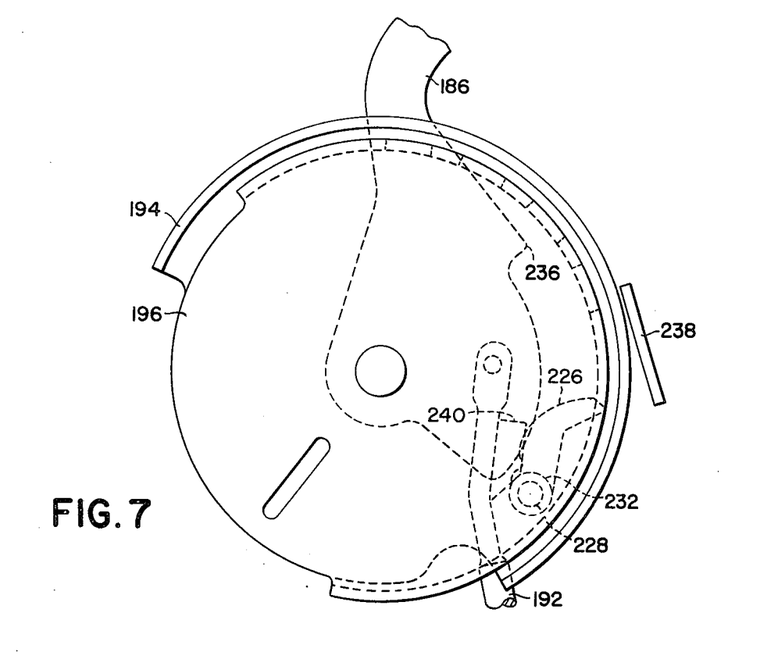

FIG. 7 illustrates the condition of the components of the interlock system when the control lever 200 is in its park position and it is attempted to move the control lever 186 from its direct drive position to its creeper position. As can be seen in FIG. 7, it is impossible to move the lever 186 to its creeper drive position due to engagement between the bottom of the stop block 240 and the cap 232.

Figure 8:
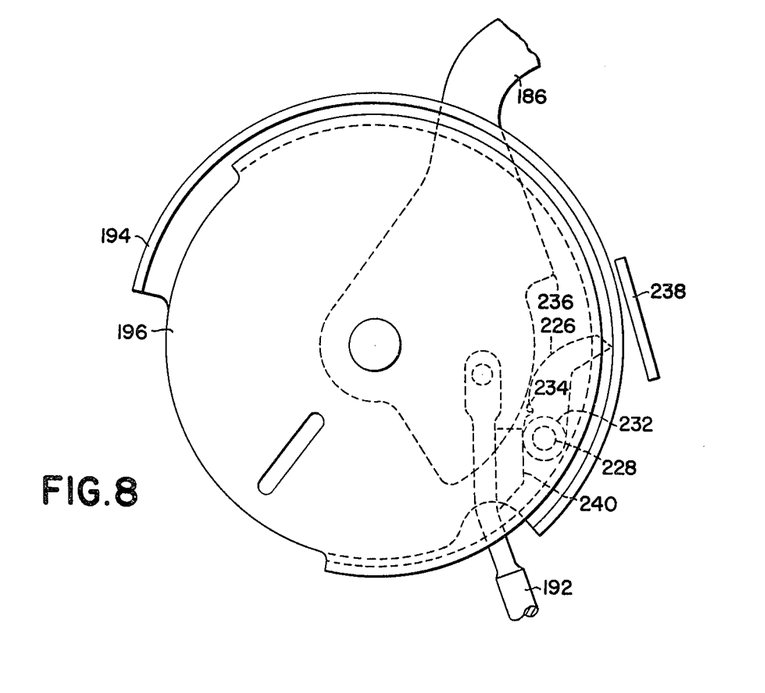

FIG. 8 illustrates the condition of the components of the interlock system when the control lever 186 is in its creeper drive position and is attempted to move the control lever 200 to its park position. As can be seen in FIG. 8, this is prevented by engagement between the side of the stop block 240 and the cap 232.

Having thus described a single preferred embodiment of the invention, various modifications within the spirit and scope of the invention will become apparent to those skilled in the art, and such modifications can be made without departing from the underlying principles of the invention. For example, the first section of the transmission could be replaced with a simple forward-reverse transmission section which would permit a greater number of reverse transfer ratios, and in this instance the interlock system would operate to limit reverse speed. Because of the numerous modifications within the scope of the invention which could be made, the invention should not be limited to the detailed illustration and description of the preferred embodiment, but only by the following claims.

I claim:

1. A mechanical transmission including an input member, an output member, speed change means coupled between the input and output members and being selectively setable in a plurality of transfer ratio conditions, first and second manual control means rockable about a fixed axis, first control linkage means coupled between the first manual control means and the speed change means to set the speed change means in direct or underdrive transfer ratio conditions upon movement of the first manual control means between first and second positions, respectively, second control linkage means coupled between the speed change means and the second manual control means to set the speed change means in any one of a plurality of transfer ratio conditions within the direct or underdrive transfer ratio conditions upon movement of the second manual control means to any one of a plurality of positions, and interlock means acting between the first and second manual control means to prevent movement of the first and second manual control means to positions in which the speed change means is set in the highest of the plurality of transfer ratio conditions within the underdrive transfer ratio condition.

2. A mechanical transmission as set forth in claim 1 wherein the second manual control means includes a park position in which it simultaneously sets the speed change means in two transfer ratio conditions to effectively lock the speed change means, and the interlock means includes stop members carried by the first and second manual control means and engageable to prevent movement of the first manual control means to its second position when the second manual control means is in its park position and to prevent movement of the second manual control means to its park position when the first manual control means is in its second position.

3. A mechanical transmission including a first section having an input member, an output member and speed change means coupled between the input and output members and being selectively setable in first and second conditions to transfer rotation of the input member to the output member at first and second transfer ratios, respectively; first manual control means movable between first and second positions associated with the speed change means of the first section to set the speed change means in its first and second conditions upon movement to its first and second positions, respectively; a second section including an output member and speed change means coupled between the output members of the first and second sections and being setable in a plurality of conditions to transfer rotation of the first section output member to the second section output member at a plurality of distinct transfer ratios; second manual control means movable between a plurality of positions and associated with the second section speed change means to set the second section speed change means in a different one of its conditions in each of its plurality of positions; stop means carried by each of the first and second manual control means engageable with each other to prevent movement of the second manual control means to predetermined positions when the first manual control means in one position and to prevent movement of the first manual control means to said one position when the second manual control means is in any one of said predetermined positions, whereby the number of transfer ratios of the second section is less when the first section is in one of its conditions than the number of transfer ratios of the second section when the first section is in the other of its conditions.

4. A mechanical transmission as set forth in claim 3 wherein the second manual control means includes a park position in which it simultaneously sets the second section speed change means for two speed transfer ratios to effectively lock the second section speed change means, and additional stop means on the first and second manual control means cooperate with each other to prevent movement of the first manual control means to said one position when said second manual control means is in its park position and to prevent movement of the second manual control means to its park position when the first manual control means is in its said one position.

5. A mechanical transmission as set forth in claim 3 wherein the first manual control means includes a first lever mounted for rocking movement about a fixed axis between first and second positions, the second manual control means includes a second lever mounted for rocking movement about the fixed axis and side-to-side pivotal movement and first and second ratio selector members mounted for rocking movement about the fixed axis on opposite sides of the second lever and each including notch means for receiving the second lever as the second lever is moved from side-to-side, the first ratio selector member is movable relative to the second ratio selector member to set the speed change means of the second section for any one of a plurality of speed transfer ratios and the second ratio selector member is movable relative to the first ratio selector member to set the speed change means of the second section for any one of a plurality of transfer ratio ranges within each speed transfer ratio, and the stop means carried by the first and second manual control means includes a stop shoulder on the first lever and a first stop member carried by the first ratio selector member and movable therewith in a plane containing the plane of movement of the stop shoulder and engageable with the stop shoulder to prevent movement of the first lever to the first of its positions when the first ratio selector member has set the speed change means of the second section for the highest of its speed ratios and to prevent movement of the first ratio selector member to set the speed change means of the second section for the highest of its speed ratios when the first lever is in its first position.

6. A mechanical transmission as set forth in claim 5 wherein the stop means further includes a second stop member carried by the second ratio selector member and movable therewith, the first stop member includes a pawl pivotally mounted on the first ratio selector member for movement between a retracted position and an extended position in which it extends across the path of movement of the second stop member and being normally biased to its retracted position, and cam follower surface means on the pivoted pawl engageable with the stop shoulder to move the pawl to its extended position for engagement with the second stop member to prevent movement of the first lever to the first of its positions when the first and second ratio selector members have set the speed change means of the second section for the highest of the transfer ratio ranges and the second highest of the speed transfer ratios and to prevent movement of the second ratio selector member to set the speed change means for the highest of its transfer ratio ranges when the first lever is in the first of its positions and the first ratio selector member has set the speed change means of the second section for the second highest of its speed transfer ratios.

7. A mechanical transmission as set forth in claim 6 wherein the first ratio selector member is rockable to a position in which it simultaneously sets the speed change means of the second section for two speed transfer ratios to effectively lock the speed change means of the second section, link means operatively connects the first lever with the speed change means of the first section, and additional stop means on the link means and first ratio selector member cooperate with each other to prevent movement of the first lever to the first of its positions when the first ratio selector member is in its park position and to prevent movement of the first ratio selector member to its park position when the first lever is in the first of its positions.

* * * * *